United States Patent
Cook et al.

(10) Patent No.: US 7,158,792 B1
(45) Date of Patent: Jan. 2, 2007

(54) SELECTING A WIRELESS LINK IN A PUBLIC WIRELESS COMMUNICATION NETWORK

(75) Inventors: Fred S. Cook, Olathe, KS (US); John W. Linebarger, Charlotte, NC (US)

(73) Assignee: Sprint Communications Company L.P., Overland Park, KS (US)

( * ) Notice: Subject to any disclaimer, the term of this patent is extended or adjusted under 35 U.S.C. 154(b) by 742 days.

(21) Appl. No.: 09/957,186

(22) Filed: Sep. 20, 2001

(51) Int. Cl.
*H04Q 7/20* (2006.01)

(52) U.S. Cl. ............... 455/450; 455/452.1; 455/452.2; 455/455; 455/458

(58) Field of Classification Search ............ 455/426.1, 455/426.2, 450–452.1, 452.2, 454, 67.11, 455/67.13, 464, 572.1, 456.1, 456.2, 62, 455/455, 458, 465
See application file for complete search history.

(56) References Cited

U.S. PATENT DOCUMENTS

| | | | | |
|---|---|---|---|---|
| 5,276,908 A | * | 1/1994 | Koohgoli et al. | 455/454 |
| 5,930,720 A | * | 7/1999 | Zhao et al. | 455/464 |
| 6,289,207 B1 | * | 9/2001 | Hudecek et al. | 455/150.1 |
| 6,456,600 B1 | * | 9/2002 | Rochberger et al. | 370/255 |
| 6,492,941 B1 | * | 12/2002 | Beason et al. | 342/357.1 |
| 6,611,695 B1 | * | 8/2003 | Periyalwar | 455/450 |
| 6,850,506 B1 | * | 2/2005 | Holtzman et al. | 370/335 |
| 2002/0025807 A1 | * | 2/2002 | Zimmerman et al. | 455/423 |
| 2002/0080755 A1 | * | 6/2002 | Tasman et al. | 370/338 |
| 2002/0118649 A1 | * | 8/2002 | Farley | 370/252 |
| 2002/0122406 A1 | * | 9/2002 | Chillariga et al. | 370/347 |
| 2003/0003873 A1 | * | 1/2003 | Raghothaman | 455/67.1 |
| 2003/0013454 A1 | * | 1/2003 | Hunzinger | 455/452 |
| 2003/0027578 A1 | * | 2/2003 | Zeira et al. | 455/452 |
| 2003/0040322 A1 | * | 2/2003 | Lection et al. | 455/456 |

* cited by examiner

Primary Examiner—Matthew D. Anderson
Assistant Examiner—Tuan Pham

(57) ABSTRACT

A wireless communication device automatically and periodically monitors each of a plurality of wireless links in a public wireless communication network to generate a set of link metrics for each of the wireless links. The wireless communication device then processes the link metrics to generate historical performance data for the wireless links. The wireless communication device selects a selected wireless link from the plurality of wireless links based on the historical performance data. The wireless communication device then uses the selected wireless link to communicate over the public wireless communication network.

32 Claims, 5 Drawing Sheets

SELECTING A WIRELESS LINK IN A PUBLIC WIRELESS COMMUNICATION NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to a system and method that selects a wireless link in a public wireless communication network.

2. Description of the Prior Art

Wireless communication devices communicate with each other over a frequency or a range of frequencies. A wireless link is a frequency or a group of frequencies that users communicate over. Similarly, a channel is a frequency or a group of frequencies that users communicate over. In the United States, some of these frequencies are designated by Federal Communication Commission (FCC) to be shared by public users as opposed to being licensed to a specific corporation or institution. A citizen band (CB) radio is one example of a wireless communication device that communicates using these shared public frequencies. Some recommended guidelines for shared public frequencies require that the sender listen to the desired wireless link for ten milliseconds prior to transmission to ensure that the wireless link is currently not in use. Unfortunately, these guidelines do not assist in determining whether the wireless link is the best available or the least used in a group of wireless links.

Recently, the FCC approved a range of frequencies called the Family Radio Service (FRS) for two-way personal communications. These handheld FRS devices allow users to communicate over an agreed upon channel. Each channel relates to a frequency in the FRS range. Unfortunately, these FRS devices have no mechanism for selecting an available channel that is not in use. Users first agree upon a channel, and if that channel is unavailable, the users may have to hunt for another available channel.

Another wireless communication device called scanners are radio receivers that skip across a range of frequencies and allow a user to listen to a specific frequency. In manual mode, the user selects the specific frequency to listen to. In scan mode, the scanner cycles through a group of frequencies and stops at a frequency when a radio signal is detected. Scanners are not designed to find the least used or available frequencies. Instead, these scanners are designed to find frequencies that are in use so users can listen to these frequencies.

Some cordless phones communicate with a base device using one channel. When the line quality on the channel deteriorates, the user can select another channel by pressing a button on the cordless phone. The cordless phone then selects a next channel with the user determining the quality of the channel.

None of the prior devices or systems allows a user to select an optimal wireless link from a group of wireless links where the optimal wireless link is the best available or the least used in the group of wireless links.

SUMMARY OF THE INVENTION

The invention helps solve the above problems by selecting a wireless link based on historical performance data for the wireless links. A wireless communication device automatically and periodically monitors each of a plurality of wireless links in a public wireless communication network to generate a set of link metrics for each of the wireless links. The wireless communication device then processes the link metrics to generate historical performance data for the wireless links. The wireless communication device selects a selected wireless link from the plurality of wireless links based on the historical performance data. The wireless communication device then uses the selected wireless link to communicate over the public wireless communication network.

In some embodiments, the wireless communication device is a family radio service radio, a cordless phone, a base for a cordless phone, a cellular phone, or a base station. In other embodiments, the link metrics are traffic measurements, interference measurements, line quality measurements, or capacity measurements. In some embodiments, the historical performance data is a total of the link metrics or an average of the link metrics.

In some embodiments, the wireless communication device stores the link metrics in memory. In one embodiment, the wireless communication device stores the historical performance data in memory. In another embodiment, the wireless communication device receives a request signal and selects the selected wireless link from the plurality of wireless links in response to the request signal. In another embodiment, the wireless communication device generates and transmits a link message indicating the selected wireless link.

The wireless communication device advantageously selects the wireless link based on a group of available wireless links. Another advantage is the wireless communication device selects the wireless link based on the historical performance data, which provides a larger timeframe to determine which wireless link is optimal. By selecting based on all the wireless links and using a larger timeframe, the wireless communication device selects a wireless link that is the least used or the best available from the group of wireless links.

BRIEF DESCRIPTION OF THE DRAWINGS

The same reference number represents the same element on all drawings.

DETAILED DESCRIPTION OF THE INVENTION

Figure 1:
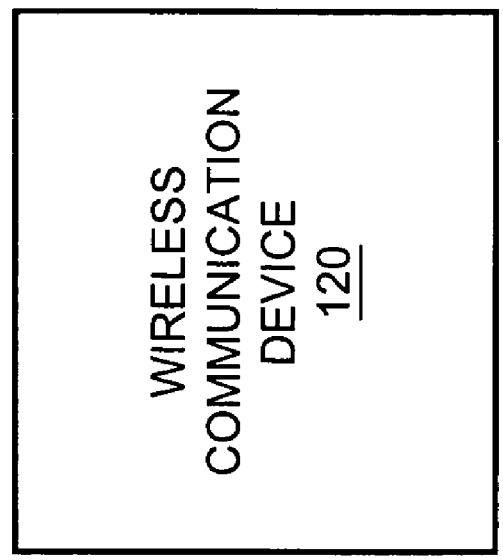
FIG. 1 is a block diagram of a public wireless communication network in an example of the invention.
Figure 1:
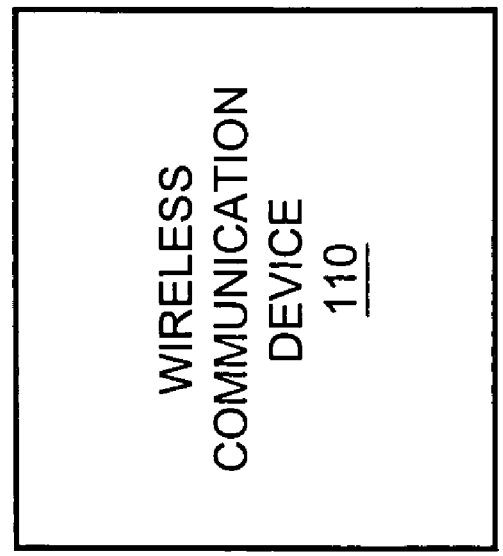
Figure 2:
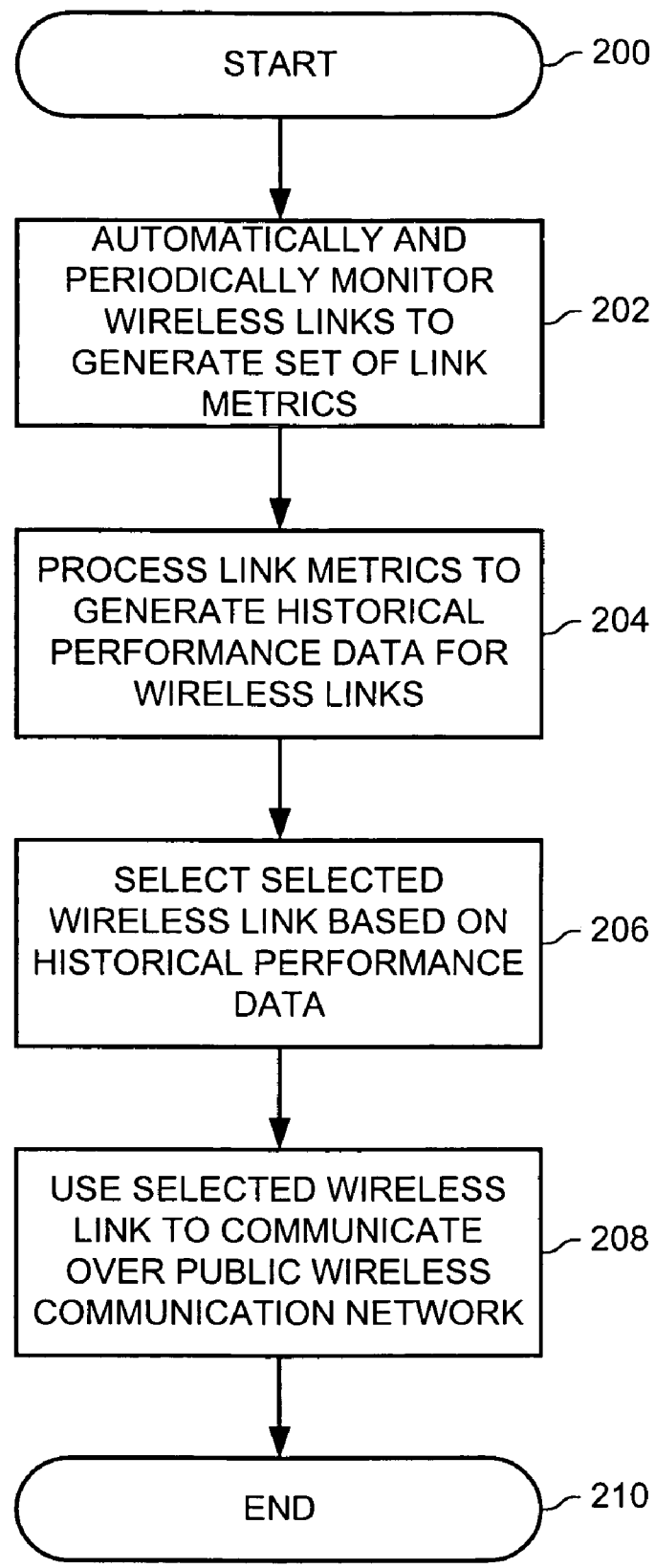
FIG. 2 is a flow chart of a wireless communication device in an example of the invention.

Public Wireless Communication Network—FIGS. 1–2

FIG. 1 depicts a block diagram of a public wireless communication network 100 in an example of the invention. The public wireless communication network 100 comprises a wireless communication device 110 and a wireless communication device 120.

The public wireless communication network 100 is any communication network or group of communication devices that communicates using wireless signals over a range of frequencies that the public shares. One example of the public wireless communication network 100 is a group of family radio service (FRS) devices, where the FRS devices communicate in the FRS frequency range, which is dedicated to being shared by the public.

The wireless communication device 110 is any communication device that communicates using wireless signals and is configured to (1) automatically and periodically monitor each of a plurality of wireless links in the public wireless communication network 100 to generate a set of link metrics for each of the wireless links, (2) process the link metrics to generate historical performance data for the wireless links, (3) select a selected wireless link from the plurality of wireless links based on the historical performance data, and (4) use the selected wireless link to communicate over the public wireless communication network 100. Some examples of the wireless communication devices 110 and 120 are FRS devices, cell phones, base stations, cordless phones, and bases for cordless phones.

A wireless link is any wireless connection that uses a frequency or a group of frequencies of wireless signals. Link metrics are any data or information that is measured, estimated, or calculated from the performance of the wireless link. Some examples of the link metrics are traffic, interference, line quality, and capacity measurements. Some specific examples of the links metrics are the frequency of use of the wireless link, the percentage of capacity of the wireless link, and the time and length of the last observed traffic. Historical performance data is any data, calculation, or information indicating the performance of a wireless link over a period of time. Some examples of the historical performance data are the totals or averages of the link metrics. Some other examples of the historical performance data are weighted averages of the traffic, interference, and capacity link metrics.

FIG. 2 depicts a flow chart for the wireless communication device 110 in an example of the invention. FIG. 2 begins in step 200. In step 202, the wireless communication device 110 automatically and periodically monitors each of a plurality of wireless links in the public wireless communication network 100 to generate a set of link metrics for each of the wireless links. In step 204, the wireless communication device 110 processes the link metrics to generate historical performance data for the wireless links. In step 206, the wireless communication device 110 selects a selected wireless link from the plurality of wireless links based on the historical performance data. The wireless communication device 110 then uses the selected wireless link to communicate over the public wireless communication network 100. In this embodiment, the wireless communication device 110 uses the selected wireless link to communicate with the wireless communication device 120.

The wireless communication device advantageously selects the wireless link based on a group of available wireless links. Also, another advantage is the wireless communication device selects the wireless link based on the historical performance data, which provides a larger timeframe to determine which wireless link is optimal. By selecting based on all the wireless links and using a larger timeframe, a wireless link is selected that is the least used or the best available from the group of wireless links.

Figure 3:
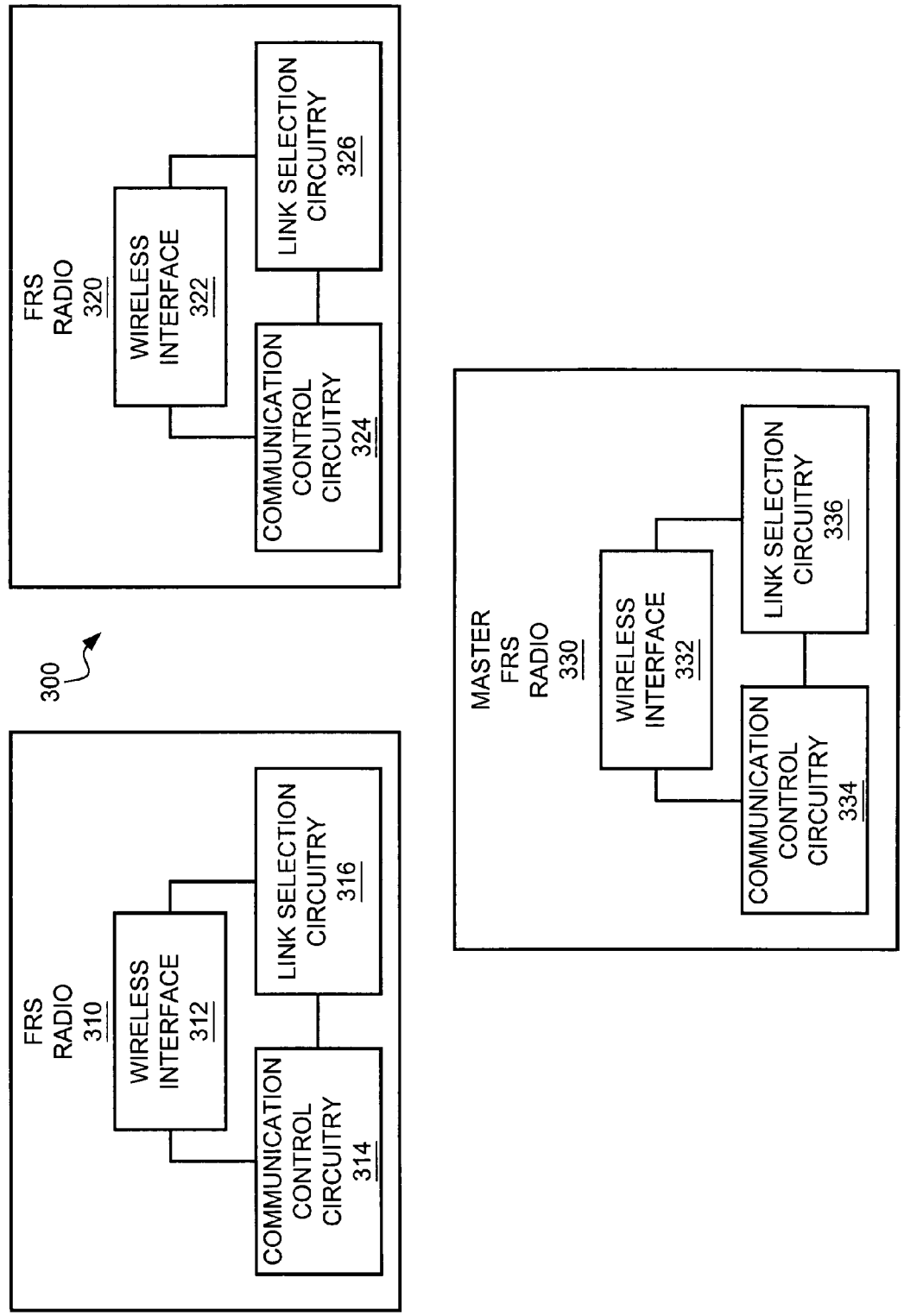
FIG. 3 is a block diagram of a public wireless communication network with family radio service radios in an example of the invention.
Figure 4:
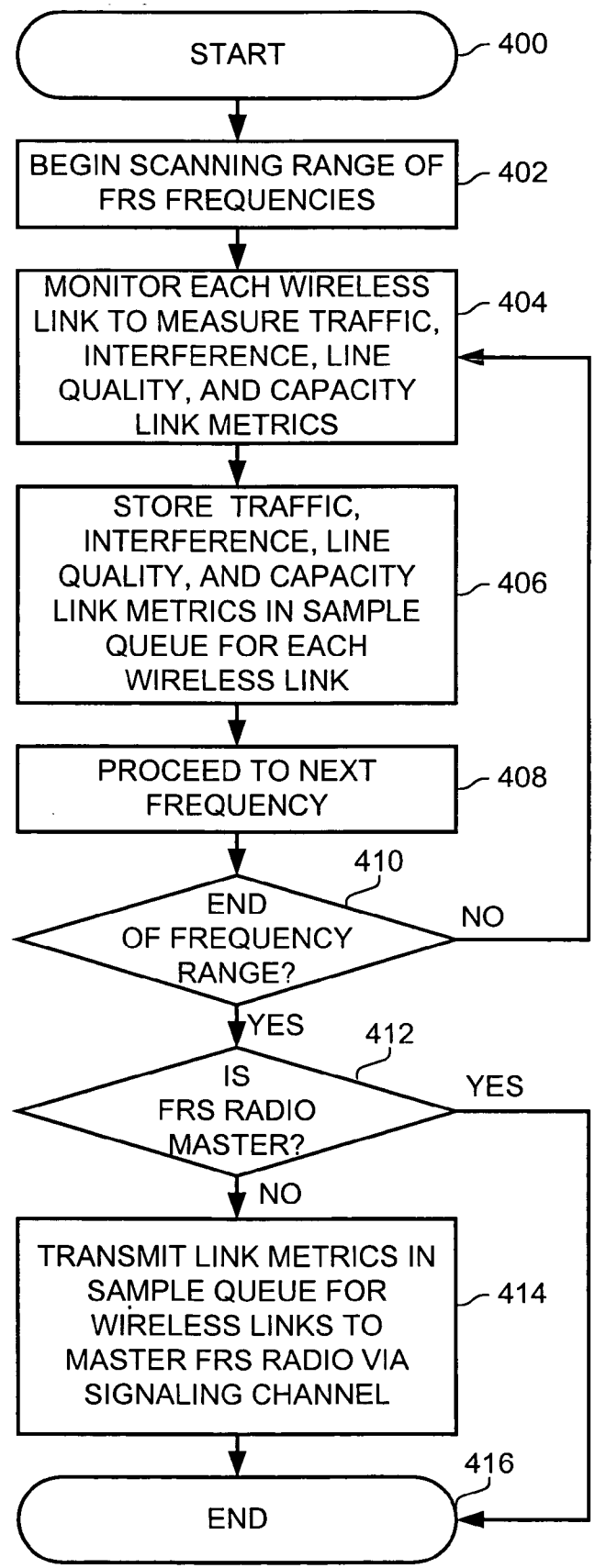
FIG. 4 is a flow chart of link selection circuitry for monitoring wireless links in an example of the invention.
Figure 5:
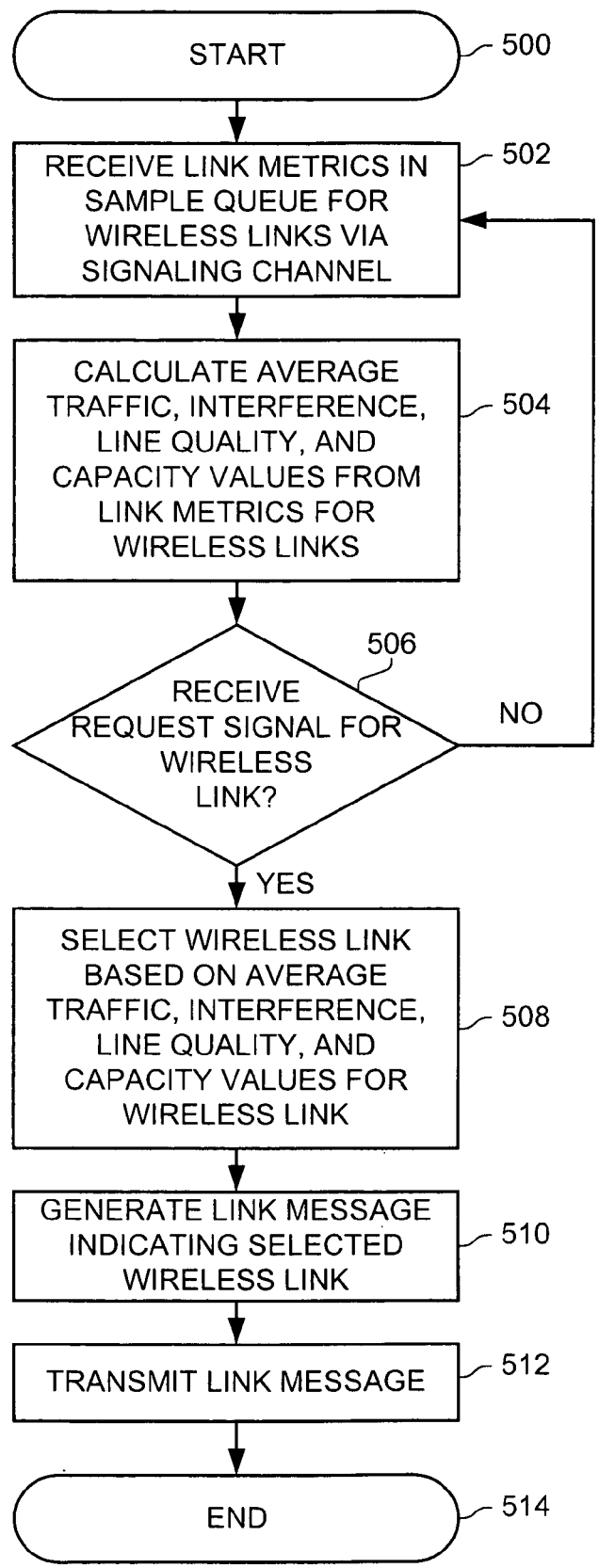
FIG. 5 is a flow chart of link selection circuitry for selecting a wireless link in an example of the invention.

Public Wireless Communication Network with Family Radio Service Radios—FIGS. 3–5

FIGS. 3–5 and the following description depict specific examples of a public wireless communication network and wireless communication devices to teach those skilled in the art how to make and use the best mode of the invention. For the purpose of teaching inventive principles, some conventional aspects of the public wireless communication network and wireless communication devices have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 3 depicts a block diagram of a public wireless communication network 300 with family radio service radios in an example of the invention. The public wireless communication network 300 comprises a FRS radio 310, a FRS radio 320, and a master FRS radio 330. The FRS radio 310 includes a wireless interface 312, communication control circuitry 314, and link selection circuitry 316. The wireless interface 312 is connected to the communication control circuitry 314 and the link selection circuitry 316. The communication control circuitry 314 is connected to the link selection circuitry 316. The FRS radio 320 includes a wireless interface 322, communication control circuitry 324, and link selection circuitry 326. The wireless interface 322 is connected to the communication control circuitry 324 and the link selection circuitry 326. The communication control circuitry 324 is connected to the link selection circuitry 326. The master FRS radio 330 includes a wireless interface 332, communication control circuitry 334, and link selection circuitry 336. The wireless interface 332 is connected to the communication control circuitry 334 and the link selection circuitry 336. The communication control circuitry 334 is connected to the link selection circuitry 336.

Those skilled in the art understand that there are numerous components such as user interfaces, speakers, microphones, power supplies, and antennas that are not shown in the FRS radios for the sake of simplicity and clarity. Also, the wireless interface 312, the communication control circuitry 314, and the link selection circuitry 316 may be combined with each other. The wireless interface 312 is a conventional wireless interface that handles the wireless communication with other FRS radios. The wireless interface 312 exchanges wireless signals with other FRS radios and exchanges signals with the communication control circuitry 314 and the link selection circuitry 316. The wireless interfaces 322 and 332 perform the same functions as the wireless interface 312. The communication control circuitry 314 is conventional circuitry that manages and controls the wireless communication in the FRS radio 310. The communication control circuitry 324 and 334 perform the same functions as the communication control circuitry 314.

In this embodiment for master selection, the master FRS radio 330 receives link metrics from the other FRS radios 310 and 320 and selects which wireless link the FRS radios will use. In another embodiment for voting, each of the FRS radios may vote for which wireless link to use with one FRS radio selecting the wireless link. In some embodiments, the FRS radios 310, 320, and 330 communicate with each other by transferring data such as link metrics, historical performance data, or voting information using a signaling channel. A signaling channel is a channel, frequency, or wireless link reserved to transfer signaling information and not user communications. In some embodiments, the FRS radios are linked by a common identifier for a communication session. Some examples of a common identifier are electronic serial number or session identification number.

FIG. 4 is a flow chart of the link selection circuitry 316 for monitoring wireless links in an example of the invention. The link selection circuitry 326 and 336 may also perform the operation for monitoring wireless links in FIG. 4. FIG. 4 begins in step 400. In step 402, the link selection circuitry 316 begins scanning the range of FRS frequencies. In this embodiment, each FRS frequency is associated with one wireless link. In step 404, the link selection circuitry 316 monitors a wireless link to measure traffic, interference, line quality, and capacity link metrics for the wireless link. In step 406, the link selection circuitry 316 stores the traffic, interference, line quality, and capacity link metrics in a sample queue for the wireless link in memory.

In one embodiment, the link selection circuitry 316 minimizes the storage of the historical performance data by performing a sliding window average calculation as values are received. For example for a sliding window of five values, the first four values for the historical performance data are 2, 4, 3, and 2, which is an average of 2.75. Once the next value of 1 is received, the sliding window average is 2.4 from the calculation of $((4 \times 2.75)+1)/5$. For the next values of 5, 4, and 3, the sliding window averages are 2.92, 3.13, and 3.10 respectively. Thus, the link selection circuitry 316 only has to store one value of a sliding window average to capture previous values.

In step 408, the link selection circuitry 316 proceeds to next frequency. In step 410, the link selection circuitry 316 determines whether the next frequency is beyond the end of the FRS frequency range. If the next frequency is not beyond the FRS frequency range, the link selection circuitry 316 returns to step 404. If the next frequency is beyond the FRS frequency range, the link selection circuitry 316 determines whether the FRS radio is the master that will select the wireless link in step 412. There are numerous implementations to designate which FRS radio is the master FRS radio. One implementation is a master button on the FRS radio. If the FRS radio 310 is not the master, the link selection circuitry 316 transmits the link metrics in the sample queue for all the wireless links from the memory to the master FRS radio 330 via the signaling channel in step 414. If the FRS radio 310 is the master, the link selection circuitry 316 proceeds to the end at step 416 to bypass the transmission of link metrics because the FRS radio 310 will make the selection of the wireless link. FIG. 4 ends in step 416. The link selection circuitry 316 may repeat the operation in the flow chart in FIG. 4 to monitor the wireless links automatically and periodically.

FIG. 5 depicts a flow chart of the link selection circuitry 336 for selecting a wireless link in an example of the invention. The link selection circuitry 316 and 326 may perform the same operation in FIG. 5 if the respective FRS radio 310 and 320 are chosen to be the master FRS radio. FIG. 5 begins in step 500. The link selection circuitry 336 receives the link metrics for all the wireless links via the signaling channel in step 502. In step 504, the link selection circuitry 336 calculates the average traffic, interference, line quality, and capacity values from link metrics for wireless links. The link selection circuitry 336 uses the link metrics for this calculation for a finite number of samples. These finite number of samples represents a period of time such as the last ten minutes or the last half hour. Depending on the burstiness of the traffic, the number of link metrics in the sample queues may vary. This provides enough data for the link selection circuitry 336 to determine which wireless link is optimal for wireless communications such as the least used wireless link or the best available. The average values of traffic, interference, line quality, and capacity link metrics are examples of the historical performance data. In some embodiments, the link selection circuitry 336 stores the historical performance data in memory.

In step 506, the link selection circuitry 336 determines whether a request signal for a wireless link has been received. The request signal is any message, signal, or instruction that indicates a request to use a wireless link for wireless communications. In some embodiments, the request signal originates from a button on the FRS radio 330 to find a wireless link. In other embodiments, the request signal is from turning on the FRS radio 330. If no request signal is received, the link selection circuitry 336 returns to step 502. If a request signal is received, the link selection circuitry 336 selects a selected wireless link based on the average traffic, interference, line quality, and capacity values for all wireless links in step 508. There are numerous variations in determining how a wireless link is selected from the historical performance data. One example is the wireless link is chosen from the wireless links with the least interference in the last hour. Another example is the wireless link is chosen from the wireless links with the least traffic in the past ten minutes. Another example is the wireless link is chosen from a combination of the historical performance data. In one embodiment, the link selection circuitry 336 displays a list of wireless links and the historical performance data. The link selection circuitry 336 then receives a selection of the wireless link from the user.

In step 510, the link selection circuitry 336 generates a link message indicating the selected wireless link. The link message is any message, signal, or instruction that indicates a wireless link for wireless communications. In step 512, the link selection circuitry 336 then transmits the link message to the communication control circuitry 334 to use the selected link in wireless communication. FIG. 5 ends in step 514.

The above-described elements could be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

What is claimed is:

1. A method of operating a wireless communication device, the method comprising:
   automatically and periodically monitoring each of a plurality of wireless links in a public wireless communication network to generate a set of link metrics for each of the wireless links;
   processing the link metrics to generate historical performance data for the wireless links;
   generating first voting information indicating at least one of the wireless links based on the historical performance data;
   receiving second voting information from a second wireless communication device and third voting information from a third wireless communication device;
   transferring a selection of a selected wireless link to the second wireless communication device and the third wireless communication device, wherein the selection is based at least in part on the first voting information, the second voting information, and the third voting information; and
   using the selected wireless link to communicate with the second wireless communication device and the third wireless communication device over the public wireless communication network.

2. The method of claim 1 wherein the wireless communication device comprises a family radio service radio.

3. The method of claim 1 wherein the wireless communication device comprises a cordless phone.

4. The method of claim 1 wherein the wireless communication device comprises a base for a cordless phone.

5. The method of claim 1 wherein the wireless communication device comprises a cellular phone.

6. The method of claim 1 wherein the wireless communication device comprises a base station.

7. The method of claim 1 wherein the link metrics comprise traffic measurements.

8. The method of claim 1 wherein the link metrics comprise interference measurements.

9. The method of claim 1 wherein the link metrics comprise line quality measurements.

10. The method of claim 1 wherein the link metrics comprise capacity measurements.

11. The method of claim 1 further comprising storing the link metrics in memory.

12. The method of claim 1 further comprising storing the historical performance data in memory.

13. The method of claim 1 further comprising:
    receiving a request signal into the wireless communication device wherein displaying the historical performance data for the plurality of wireless links is in response to the request signal.

14. The method of claim 1 further comprising:
    generating and transmitting a link message indicating the selected wireless link.

15. The method of claim 1 wherein the historical performance data comprises a total of the link metrics.

16. The method of claim 1 wherein the historical performance data comprises an average of the link metrics.

17. A wireless communication device comprising:
    a wireless interface configured to exchange wireless signals;
    communication control circuitry connected to the wireless interface and configured to manage and control wireless communications; and
    link selection circuitry connected to the wireless interface and the communication control circuitry and configured to automatically and periodically monitor each of a plurality of wireless links in a public wireless communication network to generate a set of link metrics for each of the wireless links, process the link metrics to generate historical performance data for the wireless links, generate first voting information indicating at least one of the wireless links based on the historical performance data, receive second voting information from a second wireless communication device and third voting information from a third wireless communication device, transfer a selection of a selected wireless link to the second wireless communication device and the third wireless communication device, wherein the selection is based at least in part on the first voting information, the second voting information, and the third voting information, and use the selected wireless link to communicate with the second wireless communication device and the third wireless communication device over the public wireless communication network.

18. The wireless communication device of claim 17 wherein the wireless communication device comprises a family radio service radio.

19. The wireless communication device of claim 17 wherein the wireless communication device comprises a cordless phone.

20. The wireless communication device of claim 17 wherein the wireless communication device comprises a base for a cordless phone.

21. The wireless communication device of claim 17 wherein the wireless communication device comprises a cellular phone.

22. The wireless communication device of claim 17 wherein the wireless communication device comprises a base station.

23. The wireless communication device of claim 17 wherein the link metrics comprise traffic measurements.

24. The wireless communication device of claim 17 wherein the link metrics comprise interference measurements.

25. The wireless communication device of claim 17 wherein the link metrics comprise line quality measurements.

26. The wireless communication device of claim 17 wherein the link metrics comprise capacity measurements.

27. The wireless communication device of claim 17 wherein the link selection circuitry is further configured to store the link metrics in memory.

28. The wireless communication device of claim 17 wherein the link selection circuitry is further configured to store the historical performance data in memory.

29. The wireless communication device of claim 17 wherein the link selection circuitry is further configured to receive a request signal wherein the link selection circuitry is configured to display the historical performance data for the plurality of wireless links in response to the request signal.

30. The wireless communication device of claim 17 wherein the link selection circuitry is further configured to generate and transmit a link message indicating the selected wireless link.

31. The wireless communication device of claim 17 wherein the historical performance data comprises a total of the link metrics.

32. The wireless communication device of claim 17 wherein the historical performance data comprise an average of the link metrics.

* * * * *